ized August 16, 1966

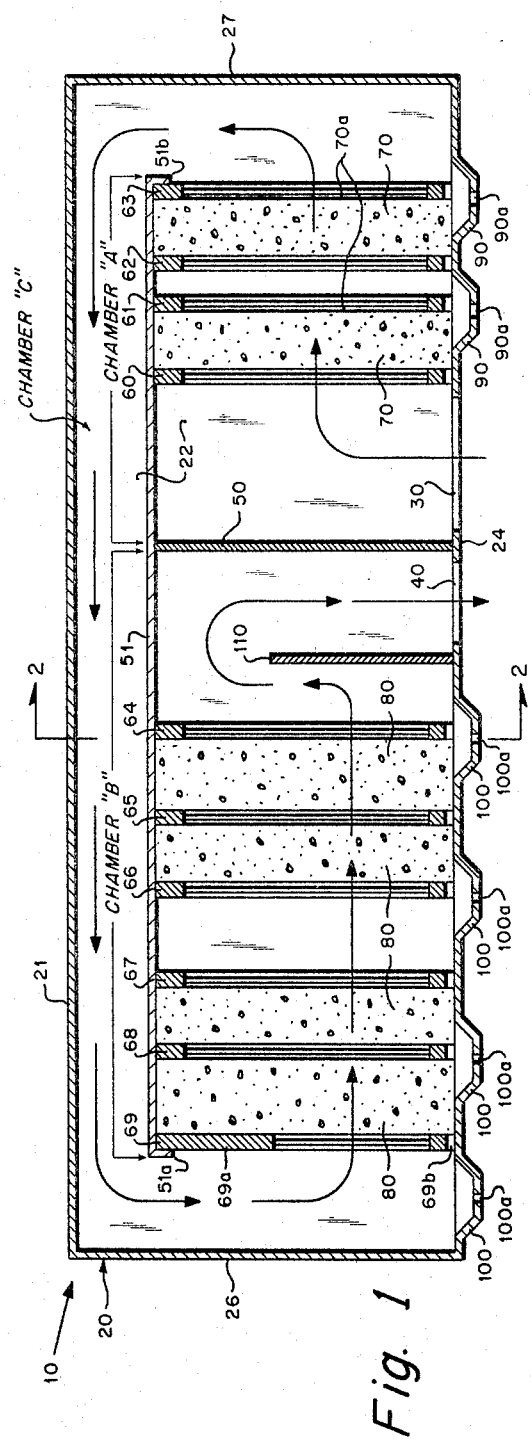
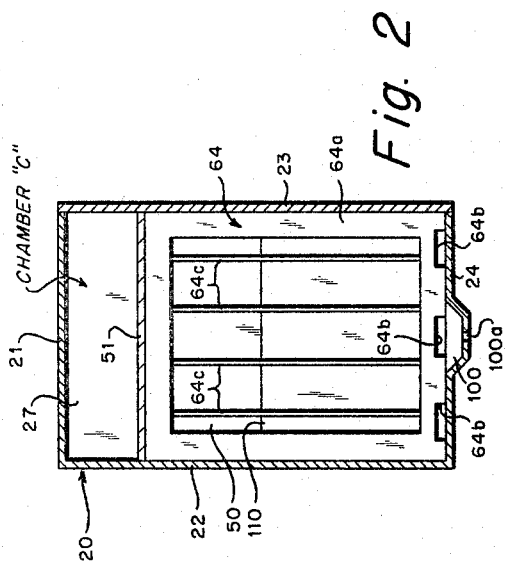

3,266,228
SEPARATOR FOR REMOVING LIQUID FROM A
FLUID MEDIUM
Bruno T. Plizak, Philadelphia, and Albert C. Check, Sr.,
Chalfont, Pa., assignors to the United States of America
as represented by the Secretary of the Navy
Filed Mar. 1, 1965, Ser. No. 436,390
1 Claim. (Cl. 55—426)

The invention described herein may be manufactured and used by or for the Government of the United States of America for governmental purposes without the payment of any royalties thereon or therefor.

This is a continuation-in-part of application Serial No. 284,264 filed May 29, 1963.

This invention relates to a water separator and more particularly to a separator for eliminating and removing contaminants contained in air in the free state.

With the advent of modern high performance aircraft and the high density of electronic systems and packages contained therein, new problems have been introduced not heretofore apparent with the slower speed aircraft which did not contain these electronic systems. These electronic packages have increased cooling requirements, heretofore met by ambient cabin air, and a greater supply of cooling air is now required for this purpose. Where the aircraft utilizes air cycle refrigeration, and atmospheric air is the major source of cooling air, there is a greater necessity for the separation and elimination of entrained moisture or water from the air so obtained from the atmosphere for purposes of cooling the aircraft electronic systems. This is particularly important since many electronic units have a cooling design which causes the cooling air to pass directly over component parts. This entrained moisture or water if not removed could cause serious problems, such as a short circuiting of the microminiaturized electronic equipment, internal corrosion, and dielectric failure. At present, the aircraft water separators being used are complex devices which utilize rotational or centrifugal action to eliminate entrained water from air. These have proven below efficiency standards of operation and often require a high operating static pressure head.

It is an object of the present invention to provide a device for separating and removing free entrained moisture from a gas.

Another object of this invention is to provide a device for separating and removing free entrained moisture from an aircraft cooling system.

A further object of the present invention is to provide a device for separating and removing free entrained moisture from the cooling air in an air cycle refreigeration system.

Still another object of this invention is to provide a device for separating and removing free entrained moisture from the cooling air in an aircraft air cycle refrigeration system utilizing engine bleed air.

A still further object of the present invention is to provide a static mechanical device having no moving parts for separating and removing free entrained moisture from an aircraft cooling system.

Still another object of the present invention is to provide a device for eliminating the large quantities of entrained water contained in the supply air of an aircraft engine bleed air cycle turbine expansion cooling system operating in hot and humid environments.

Still another object of the present invention is to provide a static mechanical device which will operate efficiently in a horizontal, elevated, or depressed altitude, which is highly efficient, inexpensive to manufacture with relatively little maintenance and installation costs, easily adaptable to various locations of utilization for eliminating the large quantities of entrained water contained in the supply air of an aircraft engine bleed air cycle turbine expansion cooling system operating in hot and humid environments and wherein the pressure drop of the device can be readily matched to that of an original cooling air duct which it replaces thus preserving the air distribution balance in the aircraft system cooling air ducts supplying other equipment whereby there is an increase in the overall reliability of the electronic equipment cooled thereby by curtailing dielectric and corrosion failures due to excessive entrained water in the cooling air.

Another object of the present invention is to provide a device for separating and removing free entrained moisture and mist from an aircraft cooling system which can replace an existing cooling air duct and which can be easily adjusted to match the pressure drop of the original cooling air duct which the device replaces whereby a back pressure is produced which is equal to that of the original duct thereby preserving the air flow distribution or air balance of the entire air cooled system.

Various other objects and advantages will appear from the following description of an embodiment of the invention and the novel features will be particularly pointed out hereinafter in connection with the appended claims.

In the drawing:

FIG. 1 illustrates a verical half section of the novel water separator; and

FIG. 2 is a view taken along the line 2—2 of FIG. 1.

In the illustrated embodiment of the invention and with specific reference to FIGS. 1 and 2, the water separator generally noted at 10 is constructed for insertion in the ducting of an aircraft refrigeration system which provides the cooling air for the aircraft electronic systems. The separator 10 has the purpose of insuring that the cooling air for the electronic systems is clean and free of entrained contaminants, such as water, and includes a rectangular housing indicated at 20 comprising a top wall 21, side walls 22 and 23, and a bottom wall 24. End walls 26 and 27 complete the enclosure of housing 20. It is understood that each of the above units are connected in such manner as to provide a pressure-tight, water-tight, and air-tight chamber or housing 20.

The bottom wall 24 of the housing 20 is provided with an inlet opening indicated at 30 through which the moisture-laden air enters the seperator 10 and an outlet opening 40 through which the uncontaminated cooling air exits the water separator 10 for subsequent use as cooling air; and the inlet opening 30 and outlet opening 40, in turn, are formed for attachment to external cooling-air lines, not shown.

A vertical baffle 50 extends vertically from and is connected to a portion of the bottom wall 24 between the inlet opening 30 and outlet opening 40 and a horizontal baffle member 51 extends longitudinally of the housing 20 at a location spaced from top wall 21 and is appropriately secured intermediate its length to vertical baffle member 50 forming a seal therewith. Baffles 50 and 51 extend throughout the width of the housing 20 and are appropriately secured by welding or the like to the sidewalls 22 and 23 and form a seal therewith by any appropriate means.

The aforesaid structural arrangement substantially provides an inlet chamber A, an outlet chamber B and a plenum chamber C. Therefore, contaminated air passing through inlet opening 30 enters the inlet chamber A and moves in the direction of the arrows shown through plenum chamber C, into outlet chamber B and discharges through outlet opening 40.

A plurality of spacers 60, 61, 62 and 63 are interposed within inlet chamber A and are secured by welding or other appropriate means to the bottom wall 24 and the horizontal baffle member 51. Similarly, outlet chamber B is formed with a series of spacers 64, 65, 66, 67 and 68 which are welded or otherwise appropriately secured to the horizontal baffle 51 and the bottom wall 24.

As more clearly viewed in FIG. 2, spacer 64, which is typical of spacers 60 through 68, comprises a rectangular frame 64a having drainage apertures 64b formed in the bottom thereof and a series of thin wires 64c extending vertically from the top of the frame to the bottom thereof and appropriately secured thereto by means well known in the art. As noted above, the frame is secured to the horizontal baffle 51 and the bottom wall 24.

In contradistinction to spacer 64, spacer 69 is formed by a frame member 69a, the upper portion of which is of greater vertical extent than that of frame 64a and is similarly formed at the lower portion thereof with drainage apertures 69b.

Referring again to FIG. 1, porous members 70 of cross sectional area equal to the cross sectional area of inlet chamber A are interposed between spacers 60 and 61 and between spacers 62 and 63. Porous member 70 is formed of open-pore foam material such as polyurethane or the like and is of a particular pore density, for example, 60 pores per inch. Similarly, porous members 80 are interposed between spacers 64, 65 and 66 and between spacers 67, 68 and 69; these members are of similar material but of smaller pore density, for example, 30 pores per inch. Although the area between spacers 66 and 67 is not filled with a porous member it should be understood that an additional porous member 80 could be interposed therebetween, or alternatively, one of the illustrated porous members 80 could be removed from their illustrated position and placed in the area between the spacers 66 and 67.

The porous foam members 70 and 80 act as the major water coalescer or agglomerator in that fine particles of entrained moisture, even in the form of mist, are coalesced into larger water particles upon impinging upon the internal surfaces of the foam. A characteristic property of the open pore polyurethane foam material is that it does not hold or retain the coalesced water droplets in a manner of a sponge but rather permits them to drop or flow downwardly through the foam thus permitting the water to be removed from the foam sections by suitably located drains, now to be discussed.

In order to provide rapid and effective elimination of water from the separator 10, drainage ports 90 are strategically located vertically below the rearward face 70a of the porous members 70; the port 90 is funnel-shaped and has its largest diameter approximately equal to the thickness of the porous member 70. The location of the drain obtains efficient operation of the water separator, the water requiring immediate drainage in order to minimize the carry over of water to adjacent sections of the separator and to prevent the coalesced water from sloshing about in the separator 10. The drainage port 90 is formed with a drain orifice 90a of predetermined size, for example, $3/32$ of an inch. A similar series of drainage ports 100 are formed in the bottom wall 24 beneath the outlet chamber B. The drain orifices 100a associated therewith are of a size smaller than the drain orifices 90a. Here, for example, the drain orifices may be $1/16$ of an inch. The use of variable drain orifice size and the critical selection thereof will minimize the air loss through the separator, will efficiently drain water from the separator and will minimize the pressure loss in the separator.

In order that the water separated from the air by the coalescers 80 and which have not been drained from the separator 10 through drainage port 100 does not discharge through outlet 40, transverse baffle 110 is secured to the bottom wall 24 adjacent the outlet 40 and engages the sidewalls 22 and 23.

As can be readily seen by the above description, the water separator 10 is so constructed that satisfactory water separation and elimination is accomplished notwithstanding a sudden change in aircraft attitude during various aircraft maneuvers, such as a steep dive or a steep climb. By reason of partition 50 which separates inlet chamber A from the outlet port 40 no water separated during the coalescing action in chamber A is permitted to pass into the outlet 40. Furthermore, any buildup of water against end wall 27 will subsequently be drained by ports 90. With reference to outlet chamber B, any water tending to build up against end wall 26 will drain through port 100 adjacent thereto or pass through the drainage apertures formed in the bottom of the spacers for subsequent drainage by an adjacent port. Any separated water which fails to discharge through the various drainage ports 100 and which seeks discharge through outlet opening 40 is precluded therefrom by baffle 110 and the water attempting to build up against baffle 110 will subsequently be drained through the adjacent port 100 when the aircraft completes its maneuver and returns to level flight.

The novel separator disclosed above provides many changes in the direction of airflow prior to entering the various foam coalescers. This feature takes advantage of the coalescing action of the bends to agglomerate the small particles for easier and subsequent separation of the water particles from the air-stream by the foam coalescers. Also, by use of the various pore sizes of foam material, back pressure throughout the system may be more adequately controlled. Furthermore, the variable drain orifice size minimizes the air loss through the separator, efficiently drains the water from the separator and minimizes the pressure loss in the separator. Also, the baffle arrangements have a dual function of directing airflow and restricting overflow of water into the airstream when the attitude of the separator is other than horizontal.

It should be understood that various modifications may be made to the structure of separator 10. For example, the spacers 60-69 may be made removable rather than fixed as described above. Also, the sidewall 23 may be provided with access openings in order to remove, replace or change the positions of porous units 70 and 80.

It will be understood that various other changes in the details, materials, steps and arrangements of parts which have been herein described and illustrated in order to explain the nature of the invention may be made by those skilled in the art within the principle and scope of the invention as expressed in the appended claims.

What is claimed is:

A device for separating and eliminating entrained liquid from a fluid medium comprising:

an elongated rectangular hollow housing member having top, bottom, side and end walls;

a longitudinal partition extending along the length of said body member and secured to said side walls forming a plenum chamber below said top wall and a passage means above said bottom wall, and openings at the ends thereof between said plenum chamber and said passage means;

a transverse partition normal to the length of said member secured between said longitudinal partition and said side and bottom walls and separating said passage means into inlet and outlet chambers;

an inlet means in said bottom wall adjacent to said transverse partition for communication with said inlet chamber, and an outlet means in said bottom wall adjacent to said transverse partition for communication with said outlet chamber, thereby causing the fluid medium to serially flow from said inlet means through said inlet chamber, plenum and outlet chamber to said outlet means;

a first and a second plurality of coalescing means secured to said bottom and side walls and said longitudinal partition in spaced relationship to each other within said inlet and outlet chambers respectively and interposed along the flow path of the fluid medium for sharply changing the direction of flow, said coalescing means comprising open-pore foam material having a forward face directed toward the flow path and a rearward face directed away from said flow path for coalescing entrained liquid in said fluid medium;

a plurality of discharge ports in the bottom wall of said housing member, directly below and in a plane with said rearward faces of said foam material, said discharge ports enabling efficient drainage of the coalesced fluid while minimizing pressure loss in the separator; and a transverse baffle secured in the bottom and side walls of said housing member adjacent the outlet means for precluding any coalesced fluid in said outlet chamber from passing to said outlet means and said transverse partition precluding any coalesced fluid from passing between said inlet chamber and said outlet chamber during a change of attitude of said separator, thereby causing the coalesced fluid to discharge through said discharge ports.

References Cited by the Examiner
UNITED STATES PATENTS

| | | | |
|---|---|---|---|
| 416,889 | 12/1889 | Barnard | 55—444 X |
| 1,572,245 | 2/1926 | Quinn | 55—446 |
| 2,112,335 | 3/1938 | Drennan | 55—31 X |
| 2,910,136 | 10/1959 | Valliant et al. | 55—320 X |
| 2,966,960 | 1/1961 | Rochlin | 55—502 |
| 2,992,814 | 7/1961 | Maher | 55—318 X |
| 2,995,204 | 8/1961 | Prostshakov | 55—320 |
| 3,030,754 | 4/1962 | Root et al. | 55—320 |
| 3,190,057 | 6/1965 | Sinex | 55—313 |

ROBERT F. BURNETT, *Primary Examiner.*

HARRY B. THORNTON, *Examiner.*

D. K. DENENBERG, *Assistant Examiner.*